US009557573B2

(12) United States Patent
Hilarius et al.

(10) Patent No.: US 9,557,573 B2
(45) Date of Patent: Jan. 31, 2017

(54) THREE DIMENSIONAL DISPLAY SYSTEM

(75) Inventors: Volker Hilarius, Gross-Umstadt (DE); Nadja Velesco, Frankfurt am Main (DE); Uri Banin, Mevaseret Zion, IL (US); Hagai Arbell, Jerusalem, IL (US); Serge Velesco, legal representative, Frankfurt am Main (DE)

(73) Assignees: Merck Patent GmbH, Darmstadt (DE); Yissum Research Development Company of the Hebrew University of Jerusalem, Ltd., Jerusalem (IL); Qlight Nanotech, Ltd., Jerusalem (IL)

(*) Notice: Subject to any disclaimer, the term of this patent is extended or adjusted under 35 U.S.C. 154(b) by 0 days.

(21) Appl. No.: 14/400,161

(22) PCT Filed: May 9, 2012

(86) PCT No.: PCT/EP2012/001986
§ 371 (c)(1),
(2), (4) Date: Jul. 16, 2015

(87) PCT Pub. No.: WO2013/167152
PCT Pub. Date: Nov. 14, 2013

(65) Prior Publication Data
US 2015/0346522 A1    Dec. 3, 2015

(51) Int. Cl.
*G02F 1/07* (2006.01)
*G02F 1/153* (2006.01)
(Continued)

(52) U.S. Cl.
CPC .......... *G02B 27/26* (2013.01); *G02B 27/2228* (2013.01); *G02F 1/0136* (2013.01); *G02F 1/0316* (2013.01);
(Continued)

(58) Field of Classification Search
USPC ................................ 359/259–275
See application file for complete search history.

(56) References Cited

U.S. PATENT DOCUMENTS 8,471,969 B2    6/2013  Banin et al.
2007/0285843 A1*  12/2007  Tran .................. B82Y 10/00
                                                    360/245.9
(Continued)

FOREIGN PATENT DOCUMENTS

EP          2262271 A1    12/2010
JP       2010145842 A     7/2010
(Continued)

OTHER PUBLICATIONS

English Translation of Office Action for related Japanese Patent Application No. 2015-510650, Date of Notice: Feb. 16, 2016, Date of Dispatch: Feb. 23, 2016.
(Continued)

*Primary Examiner* — Mohammed Hasan
(74) *Attorney, Agent, or Firm* — Millen White Zelano & Branigan, P.C.

(57)                ABSTRACT

A light emitting device is presented. The device comprises an array of pixels and an electrode arrangement, wherein said array of pixels comprises pixels of first and second groups comprising first and second pluralities of light emitting nanorods aligned along first and second predetermined axes respectively, the axes being substantially perpendicular to each other, and the pixels of said array are associated with a plurality of electrode elements of said electrode arrangement thereby enabling modulation of optical emission of one or more pixels separately from one or more other pixels of said pixel array by controllable application of an electric field, the device being therefore configured and operable as an active pixel emitter.

27 Claims, 4 Drawing Sheets

(51) Int. Cl.
*G02B 27/26* (2006.01)
*G02B 27/22* (2006.01)
*G02F 1/01* (2006.01)
*G02F 1/03* (2006.01)
*H04N 13/04* (2006.01)
*B82Y 30/00* (2011.01)
*G02F 1/1335* (2006.01)
*B82Y 20/00* (2011.01)

(52) U.S. Cl.
CPC ........... *H04N 13/0434* (2013.01); *B82Y 20/00* (2013.01); *B82Y 30/00* (2013.01); *G02F 1/13362* (2013.01); *G02F 1/133617* (2013.01); *G02F 2201/124* (2013.01); *G02F 2201/52* (2013.01); *G02F 2202/046* (2013.01); *G02F 2202/32* (2013.01); *G02F 2202/36* (2013.01); *Y10S 977/952* (2013.01)

(56) References Cited

U.S. PATENT DOCUMENTS

| | | | |
|---|---|---|---|
| 2008/0265757 A1* | 10/2008 | Forrest | H01L 51/5275 313/504 |
| 2010/0309395 A1 | 12/2010 | Murata et al. | |
| 2011/0299001 A1 | 12/2011 | Banin et al. | |
| 2014/0009902 A1 | 1/2014 | Banin et al. | |

FOREIGN PATENT DOCUMENTS

| | | |
|---|---|---|
| WO | 2010095140 A2 | 8/2010 |
| WO | 2012059931 A1 | 5/2012 |

OTHER PUBLICATIONS

English Abstract of JP-2010-145842, Publication Date: Jul. 1, 2010.
International Search Report for PCT/EP2012/001986 dated Oct. 2, 2012.

* cited by examiner

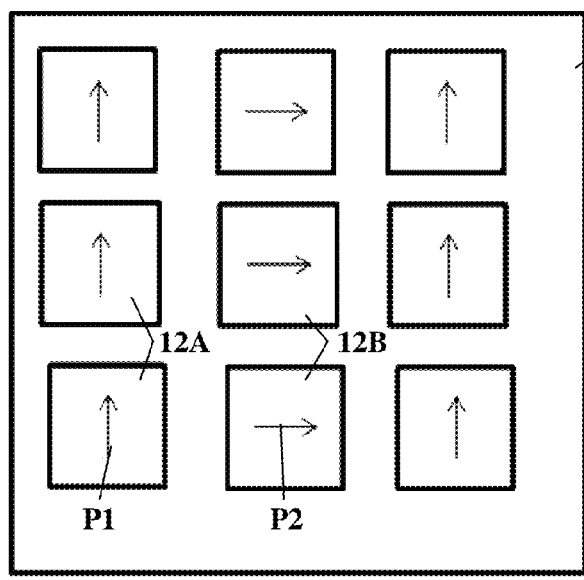
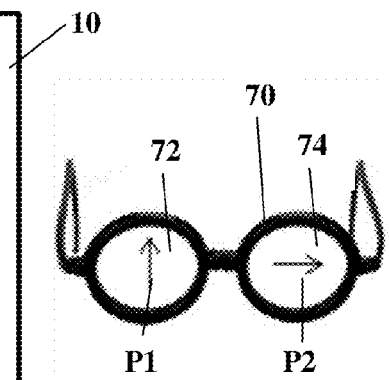
FIG. 3A
FIG. 3B
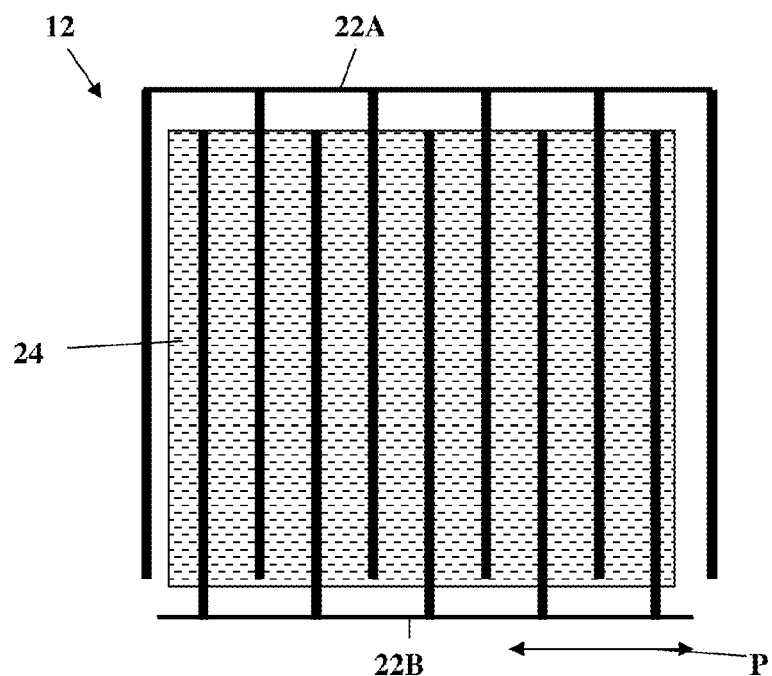
FIG. 4A

THREE DIMENSIONAL DISPLAY SYSTEM

FIELD AND BACKGROUND

This invention is generally in the field of light emitting structures, and relates to a light emitting device and a display device utilizing the same. The invention is particularly useful in three dimensional displays utilizing differently polarized light generated by modulated down converted emission from nanoparticles.

Polarization properties of light are used in a variety of optical applications (products and methods) ranging from flat panel liquid-crystal displays (LCDs) to microscopy, metallurgy inspection and optical communication. Most available light sources generate unpolarized light, and selection of specific polarization of light is typically done using polarizers of various types. The selection of a particular polarization using a polarizer usually comes at the cost of energy loss; approximately 50% of impinging light may be lost when using a simple passive (non-emissive) polarizer to provide polarized illumination using a non-polarized light source.

Efficient polarization selection of light emitted by an unpolarized light source can be achieved by locating passive (non-emissive) polymer films in the optical path of the emitted light. These films may recycle some of the light and thus enhance the transmission of light of the desired polarization. Recycling of light is based on reflecting light components of unwanted polarization onto a reflecting surface, thereby producing multiply reflected light components which depolarize after subsequent reflections, and thus at least some light components are transmitted after each reflection. However, such passive systems are complex and expensive to produce, as multiple layers are required for efficient light recycling. Another "passive" approach to recycling a backlight output through a polarizer uses a reflective nanowire grid polarizer (Ge, Zhibing and Wu, Shin-Tson. "Nanowire grid polarizer for energy efficient and wide-view liquid crystal displays.", Applied Physics Letters, 93, 121104, 2008).

Passive approaches as described above complicate the design of a backlight system and are expensive. They are also inactive in enhancing the quality of the color gamut of the emitted light, because they are wavelength dependent. In fact, the need to preserve the color gamut of the original backlight complicates further the layer structure of backlight system.

Anisotropic (elongated) nanoparticles such as nanorods (also at times referred to herein as "rods") are known as being capable of providing polarized emission. This is also described in WO 2010/095140 assigned to the assignee of the present application.

To this end WO 2010/095140 describes an optical display device and a method for use in displaying an image. The optical display device comprises An optical display device comprising: at least one region of nanostructures operable as an optically active media, such that said nanostructures are responsive to input electromagnetic radiation to emit output electromagnetic radiation, and an arrangement of electrodes being configured and operable to be selectively addressable to create an external electric field to said at least one region of nanostructures, said region of nanostructures and said arrangement of electrodes defining together a pixel arrangement of said display device; said external electric field affecting said at least one region of nanostructures to selectively modulate emission of said output electromagnetic radiation, said output electromagnetic radiation being an output of at least one pixel element of the display device. Some nanorod systems providing polarized emission are described in the following publications:

X. Peng et al., "Shape control of CdSe nanocrystals", Nature 404, 59-61, 2000 describes colloidal based semiconductor core (without shell) CdSe nanorods embedded in a polymer. Nearly full polarization can be obtained from single rods.

T. Mokari and U. Banin, "Synthesis and properties of CdSe/ZnS rod/shell nanocrystals", Chemistry of Materials 15(20), 3955-3960, 2003 describes the emission enhancement of rods by growing a shell on the rod structure.

D. V. Talapin, et al, "Seeded Growth of Highly Luminescent CdSe/CdS Nanoheterostructures with Rod and Tetrapod Morphologies", Nano Letters 7(10), pp 2951-2959, 2007 describes a quantum yield improvement achieved for seeded nanorod particles.

C. Carbone et al, "Synthesis and Micrometer-Scale Assembly of Colloidal CdSe/CdS Nanorods Prepared by a Seeded Growth Approach". Nano Letters, 7(10), pp 2942-2950, 2007 describes a dipole pattern emission of seeded rods, i.e. emission emanating from the rod center rather than its tips.

Three-dimensional (3D) display systems provide a huge enhancement to video viewers. The currently available 3D display systems utilize two main methods, one is based on polarization of light and the second is based on sequential display.

Projection of a 3D image by providing a first image, to be viewed by one of the viewer's eyes, in one polarization state and a second image, to be viewed by the second eye, in an orthogonal (e.g. perpendicular) polarization state is especially used in movie cinemas. The film is simultaneously projected onto a screen utilizing two projectors, each providing images in one polarization state, projecting two separate films on the two eyes of the viewer. The viewers need to use a related polarized eye glasses which are configured such that each of the eyes receive only the corresponding images. For example, the right eye-glass includes a polarizer blocking light of one polarization state and transmitting light of the orthogonal polarization state, and the left eye-glass includes the orthogonal polarizer.

Alternatively, alternating display of images is typically used in television displays and similar devices. The pictures for each eye are displayed sequentially (left, then right, then left, then right again and so on). The viewers have to wear an active shutter glasses device, which synchronically transmits light to one eye and blocks light from reaching to the second eye in accordance with the display sequence.

General Description

There is a need in the art for a novel and simple technique enabling simultaneous display/projection of images (e.g. video stream) to provide three-dimensional display effect. Moreover, it is desirable to enable use of this technique in a wide range of display/projector devices starting from relatively small handheld or wearable devices up to very large wall-sized display screens. Display/projection devices utilizing the technique of the present invention may be configured for various purposes e.g. for use in portable, domestic, commercial and industrial electronic equipment including advertising and signaling display applications, or further in facade decoration, as rigid or flexible display devices.

The technique of the present invention utilizes emission properties of optically active media including (colloidal)

anistropic nanoparticles and in particular nanorods. It should be understood that for the purposes of the present application the term optically active media refers to media which is characterized by light emitting properties. Therefore, the terms optically active and light emitting are used in the description below interchangeably. The inventors have found that light emitting anisotropic nanoparticles produce substantially polarized optical emission with dipole-like spatial distribution. The particle typically emits light with almost linear polarization along the longer axis of the particle, and the emitted light is of higher intensity within a plane perpendicular to this longer axis. Additionally, anisotropic nanoparticles which may be used in light emitting devices according to the present invention are nanoparticles capable of emitting light of a certain wavelength in response to optical pumping radiation of a different (shorter) wavelength range. The intensity of the optical emission of the particles being pumped can be modulated by applying electric field thereto, thus the optical emission of different nanoparticles can be electrically controlled.

Thus, the present invention provides a light emitting device, suitable for use in display/projector devices such as flat panel screens, providing monochromatic or polychromatic light with varying spatial distribution. The light emitting device comprises an array of pixels comprising pixels of two or more groups (having different optical properties of emitted light) and an electrode arrangement. The pixels comprise a plurality of light emitting nanorods, arranged such that the nanorods of a certain pixel are aligned along a certain predetermined axis. The different groups of pixels differ between them in the alignment axes of the nanorods including perpendicular axes.

A set of nanorods aligned along a common axis generate substantially polarized light. Therefore, the nanorods of pixels of the different groups, being aligned along perpendicular axes emit light portions of two substantially orthogonal polarizations. These light portions may be separated into two different light patterns (structured light) using appropriate filtering.

As indicated above, the pixel array may comprise two groups of pixels different between them in the alignment axes of the light emitting nanorods. Additionally, each of the two groups of pixels may comprise three or more sub-groups of nanorods emitting light centered about three or more different wavelengths (e.g. Red, Green and Blue) to thereby provide color images.

The electrode arrangement associated with the different pixels enable amplitude modulation of light emission, and thus the device is capable of emitting light having different spatially structured patterns, and simultaneously generating one or more images or sequence of images. Generally, the application of electric field on the nanorods of a specific pixel modulates light emission by these nanorods and darkens/brightens the pixel output. The applied electric field may lead to quenching of fluorescence emission of the nanorods (in response to optical pumping radiation), affecting the intensity of light emitted from the pixel as described in more details in the above-mentioned WO 2010/095140 assigned to the assignee of the present application and embedded herein by reference.

Thus according to a broad aspect of the present invention, there is provided a light emitting device comprising an array of pixels and an electrode arrangement. The array of pixels comprises pixels of first and second groups comprising first and second pluralities of light emitting nanorods aligned along first and second predetermined axes respectively, the axes being substantially perpendicular to each other. And the pixels of said array are associated with a plurality of electrode elements of said electrode arrangement thereby enabling modulation of optical emission of one or more pixels separately from one or more other pixels of said pixel array by controllable application of an electric field. The device being therefore configured and operable as an active pixel emitter.

According to some embodiments the light emitting nanorods emit light of a first predetermined wavelength range in response to pumping radiation of a second predetermined wavelength range. The first wavelength range may comprise wavelengths of visible spectrum. The aligned light emitting nanorods of said first and second groups of pixels may emit light of two substantially orthogonal polarizations respectively. Additionally the light emitting nanorods may emit light having a polarization ratio being higher than 1.5. It should be noted that the polarization ratio is defined as the intensity ratio between the emitted light components with polarization parallel and perpendicular to the direction of nanorod alignment.

According to some embodiments of the present invention, the electrode elements are configured and operable to apply electric field to one or more of the pixels, thereby quenching optical emission therefrom. The electrode elements may be configured to define a plurality of dedicated pairs of the electrode elements for a plurality of pixels respectively, thereby enabling separate electric field modulation for individual pixels.

The light emitting nanorods may comprise nanorods which are configured to emit light of at least three different wavelengths. Nanorods emitting light of the different wavelengths may be associated with different pixels of said pixel array.

The device may comprise a support structure carrying the light emitting nanorods. The structure is preferably configured to enable exposure of the array of pixels to pumping radiation. The device may also comprise a light source configured and operable to provide optical pumping radiation to said light emitting nanorods.

The device may comprise a patterned polarization filter located in an optical path of emitted light. The patterned polarization filter is typically configured to improve the polarization ratio of emitted light from pixels of said two groups. Additionally or alternatively the device may comprise a polarization rotator located in an optical path of light emitted from said light emitting nanorods. The polarization rotator may be configured to modify polarization of emitted light to thereby produce circular polarized light. The polarization rotator may be configured to modify the orthogonal polarizations of emitted light to produce light of two opposite circular polarizations respectively.

According to some embodiments, the electrode arrangement and the array of pixels are arranged in a common plane. The electrode elements associated with the pixels of the first and second groups of pixels may be configured to apply the electric field along two axes substantially parallel to the first and second alignment axes of the nanorods of said pixels respectively.

According to some other embodiments, the electrode arrangement may comprise first and second sets of the electrode elements located within first and second planes respectively. In this configuration the array of pixels is located in a plane between said first and second planes.

The nanorods in the device may be embedded in a carrier, being optically transparent for the pumping light and emitted light, or deposited on a substrate carrier, which is optically transparent for at least one of the pumping light and emitted light.

The nanorods may be made of one or more semiconductor materials, and may have an elongated geometry with an aspect ratio of at least 2. The nanorods may have a core-shell configuration, configured as seeded rods with a seed having a spherical or rod-like geometry.

According to some embodiments, the device may be configured and operable to emit patterned light of different first and second optical properties formed by the light emitted by the first and second pluralities of the light emitting nanorods respectively, thereby enabling for simultaneous imaging of first and second different images.

According to some other broad aspects of the present invention there is provided an active pixel display device. The active pixel display device comprises a pumping light source, a light emitting device as described above arranged such that the nanorods are exposed to pumping light, and a control unit configured to operate the electrode arrangement to control application of the electric field to selected one or more pixels of said pixel array. The control unit may be operable to cause selective application of the electric field to one or more pixels of the first and second groups, thereby enabling simultaneous display of two separate images. The display device may be configured to enable a three-dimensional effect for the display of an image stream.

BRIEF DESCRIPTION OF THE DRAWINGS

In order to understand the disclosure and to see how it may be carried out in practice, embodiments will now be described, by way of non-limiting example only, with reference to the accompanying drawings, in which:

FIGS. 3A and 3B more specifically exemplify how a display device according to the present invention can provide three-dimensional effect for viewers, where FIG. 3A illustrates pixel arrangement and FIG. 3B shows glasses for use by a spectator;

FIGS. 4A and 4B show two examples of the configuration of the electrode arrangement in the light emitting device of the invention for modulation of optical emission of the nanorods of different pixels, where FIG. 4A shows in-plane configuration and FIG. 4B shows three planes configuration.

DETAILED DESCRIPTION OF EMBODIMENTS

Figure 1:
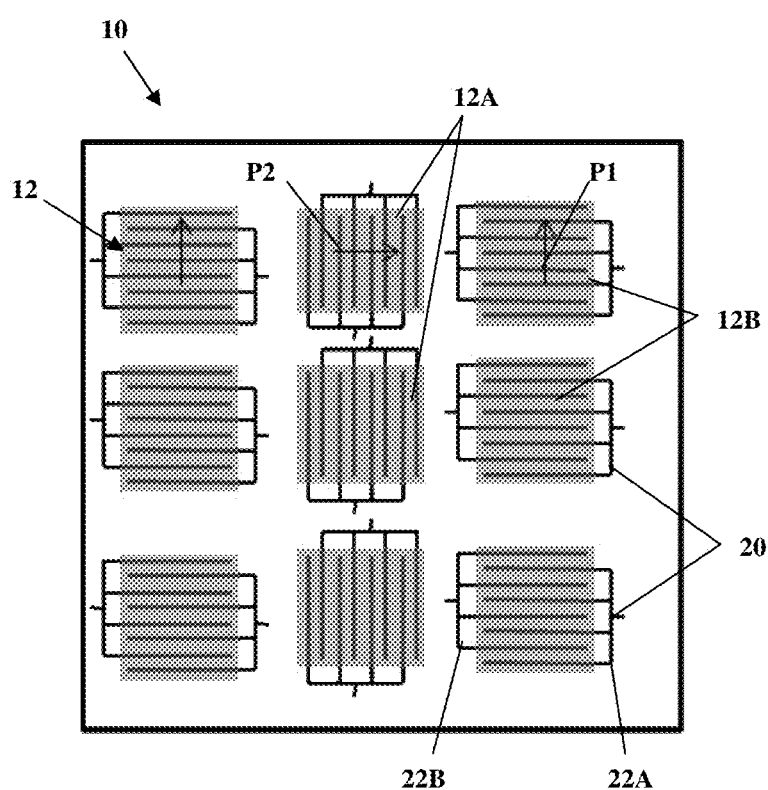
FIG. 1 illustrates a light emitting device according to an embodiment of the present invention.

Reference is made to FIG. 1 illustrating a light emitting device 10 according to some embodiments of the present invention. The device 10 includes a pixel array 12 including two (generally, at least two) groups of pixels, i.e. pixels 12A and pixels 12B, and an electrode arrangement 20. The electrode arrangement 20 includes a plurality of electrode elements and is configured to apply electric field to one or more pixels separately. In the present non-limiting example, the electrode arrangement 20 is configured such as to define a plurality of pairs of electrode elements, each being associated with a dedicated pixel. More specifically, separate electrode elements 22A and 22B are shown in the figure as belonging to a dedicated pixel. Such configuration enables individual modulation of the intensity of light emission from the optically active media of the pixels.

The optically active media include light emitting anisotropic particles, e.g. nanorods (such as semiconductor nanorods) which are arranged/aligned along predetermined intersecting axes, marked as P1 and P2. The differently aligned nanorods form the different pixels respectively. Alignment axes of the nanorods within the pixels of the two groups may be selected to be substantially perpendicular. It should be noted that the term "substantially perpendicular" as used hereinbelow actually means that the alignment axes of the nanorods are perpendicular up to a certain unavoidable error. The optically active (light emitting) nanorods aligned within the pixels typically emit light having PR values varying between 3.3 to 4.7, and thus a certain crossover between the images was seen. It should also be noted that aligned nanorods typically emit light having defined polarization characteristics. The emitted light is characterized by the polarization ratio (PR) which is the intensity ratio between the emitted light components with polarization parallel to the direction of nanorod alignment and the light components with polarization perpendicular to the direction of nanorod alignment. It should be noted that PR values of 1.1 or higher indicate a preferred orientation of the polarization axis of emitted light and thus a preferred alignment axis of the nanorods. Typical values of PR in aligned nanorods were measured to be between 2 to 5.0, and some experimental measurement provided higher PR values of 6 and more. Preferably, for use in a light emitting structure according to the present invention the aligned nanorods provide emission of light having PR values higher than 1.5, or higher than 2 and even more preferably the PR is higher than 3.

As shown in FIG. 1, the electrode elements 22A and 22B are configured to provide the electric field having a field profile such that the field lines (i.e. gradient of the electric potential) between each electrode pair are almost parallel and such that the field lines generated by electrode pairs of one group of pixels are substantially perpendicular to the field lines generated by electrode pair of the other group of pixels. Nanorods are deposited and aligned within the pixel region, between the electrode elements, such that their long axis is substantially parallel to the electric field lines (perpendicular to the electrode long dimension direction). The alignment of the nanorods within pixels of each group leads to substantially polarized emission therefrom, and thus light components emitted from pixels of different groups are polarized in two perpendicular directions. It should be noted, however, and will be described below, that other configurations of the electrode arrangement as well as other electric field profiles within the region of different pixels are possible.

The light emitting nanorods typically emit light of a first predetermined wavelength range, determined in accordance with material composition and geometrical properties of the nanorods, in response to optical pumping of a second predetermined wavelength range, which is shorter than that of the emitted light (e.g. UV or violet pumping). Thus, the light emitting device 10 may be associated with a light source providing pumping optical radiation in an appropriate wavelength range. Additionally, the pixel array 12 may include pixels having aligned nanorods configured to emit light of different wavelengths. Typically the nanorods are configured to emit light of a first wavelength range, generally of visible spectrum. However, to enable polychromatic emission (and thus polychromatic display) the pixel array includes pixels having nanorods configured to emit light of different colors, within said first wavelength range, generally at least three colors (primary colors), capable to generate together color images. For example, typical display techniques utilize a RGB color scheme, and some display techniques include yellow as an additional color for display.

It should be noted, although not specifically shown, that the pixel array 12 may include a support structure which carries the optically active media (nanorods) and is configured such as to enable exposing the nanorods to the pumping light. For example, the structure may include a carrier with the nanorods being embedded therein, in which case the carrier has optical windows (e.g. is transparent) for both the pumping and emitted wavelength ranges; or the nanorods may be deposited on the surface of a carrier in which case the latter may be transparent to either one or both of pumping and emitted wavelength ranges.

The emission of the nanorods can be modulated by applying an external electric field on the nanorods. The external electric field may lead to quenching of the fluorescence emission due, for example, an induced electron-hole separation in space (an effect which is herein termed "charge separation"). This process has a significant effect on the luminescence intensity from the nanorods. For effective quenching of the fluorescence emission, the electric field profile is such that that the electric field lines (i.e. gradient of the electric potential) are substantially parallel to the alignment axis of the nanorods. It should be noted that the configuration of the electrode elements in a common plane with the pixels can be utilized in the alignment process of the nanorods to provide the alignment axis being substantially parallel to that of the electric field lines. For example, by applying an electric field during deposition of the nanorods onto the substrate, the nanorods will follow the electric field lines and align along the desired axis.

Generally, any nanorods, or elongated anisotropic nanoparticle capable of providing polarized emission, can be used in the optically active media suitable for use in the device of the invention. Such nanorods should typically have an aspect ratio (ratio between its length and cross-sectional dimension) of at least 2. The nanoparticles may be anisotropic semiconductor nanorods of single component semiconductor or core/shell nanorods with a core of a first semiconductor and a shell layer of a second semiconductor. Typically, the core/shell configuration of nanorods may enhance optical emission in response to optical pumping, however nanorods made of a single semiconductor material may also provide sufficient optical emission. Additional examples of nanoparticle structures that may be useful as optically active media for the purposes of the present invention are core/multishell nanorods, nanoparticles of core/shell configuration where the shell is of graded composition and seeded rods. The later may be based on a nearly spherical core seed or a rod shaped seed of one semiconductor material being over-coated by a rod shaped shell of a second semiconductor material. The elongated (rod shaped) shell imparts the anisotropic properties of the emission. Seeded nanorods may have a seed (or core) located asymmetrically within an elongated shell. The core may be typically located at about one fourth to one half of the length on the elongated particle, but other locations may also be possible. Typical sizes for a seed may be between 1 to 20 nm and more particularly between 2 to 10 nm cross-sectional dimension (diameter). In addition to a first shell, further shell layers may be included for stability and optical function. The optically active media may be adjusted to provide multiple color emission as required for various applications.

It was found that generally all anisotropic rods emit light of substantially linear polarization, being polarized along an axis parallel to the long axis of the rod (varying degrees of polarization are possible). The seed itself may also have an elongated shape or a rod-like structure (e.g. with the aspect ratio of 2 or higher), further enhancing the polarization degree of the final structure. Some examples of seeded rods suitable to be used in the optically active media of the present invention are described in PCT publication WO 2012/035535 which is incorporated herein by reference with respect to this specific non-limiting example.

As indicated above, anisotropic nanoparticles (nanorods) useful for the purposes of the present invention may typically be made of semiconductor materials. Appropriate semiconductor materials may be for example of the form of II-VI, III-V, or IV-VI semiconductor families and combinations of such semiconductor materials. The material composition for use is the light emitting device of the present invention are described in the above-indicated PCT publication WO 2010/095140 assigned to the assignee of the present application. The semiconductor materials may be selected from CdS, CdSe, CdTe, ZnS, ZnSe, ZnTe, ZnO, GaAs, GaP, GaAs, GaSb, HgS, HgSe, HgTe, InAs, InP, InSb, AlAs, AlP, AlSb, $Cu_2S$, $Cu_2Se$, $CuInS_2$, $CuInSe_2$, $Cu_2(ZnSn)S_4$, $Cu_2(InGa)S_4$, $TiO_2$ and alloys thereof, and mixtures of such materials. This list of materials may refer to either the rod material (in the case of single semiconductor nanorods), to the core and shell materials (in core/shell nanorods), or to the seed and rod materials in seeded rod structures.

The nanorods structure may be overcoated by surface ligands. Additional ligands may also be used to improve/modify the formulation of the nanorods. Commonly used surface ligands include phosphines and phosphine oxides such as Trioctylphosphine oxide (TOPO), Trioctylphosphine (TOP) and Tributylphosphine (TBP); phosphonic acids such as Dodecylphosphonic acid (DDPA), Tridecylphosphonic acid (TDPA), Octadecylphosphonic acid (ODPA) and Hexylphosphonic acid (HPA); amines such as Dodecyl amine (DDA), Tetradecyl amine (TDA), Hexadecyl amine (HDA) and Octadecyl amine (ODA); thiols such as hexadecane thiol and hexane thiol; and mercapto carboxylic acids such as mercapto propionic acid and mercaptoundecanoic acid. Additional ligands custom made for a specific purpose can also be used.

The length of the overall nanorod structures may range between 8 nm to 500 nm and preferably between 10 to 160 nm. The overall diameter of a rod may be between 1-20 nm, and more particularly between 1-10 nm. A typical nanorod has an aspect ratio length/diameter of above 2, or preferentially an aspect ratio of above 3.

The emission wavelength (color) of the anisotropic nanorods, in response to pumping light, can be appropriately selected by controlling the size and/or material composition of the nanorods. This flexibility in tuning/adjusting the emission wavelength enables high variations of colors in the light emitting device generating required base colors for display. For example, a single type of rod sample can be used for a monochromatic backlight source for a monochrome display, or a combination of two or more different rods emitting at different colors can be used for a color display. Additionally, each color (of three or more colors provided by a polychromatic display) may be generated by a combination of nanorods configured (typically by size variations) to emit light of a certain wavelength distribution around the selected color (corresponding to a central wavelength). Thus, each pixel may include aligned nanorods of a certain size distribution providing optical emission with a selected distribution around a selected central wavelength (e.g. red, green or blue). The group of pixels having a common alignment axis (i.e. emitting light of the same polarization) may include pixels formed by nanorods configured to respond to the pumping light by emitting light of different colors.

The light emitting device 10 of the present invention, or sections thereof corresponding to single pixels or sets of pixels, may be produced as a layer including the aligned nanorods placed (deposited) on a substrate (carrier) made of glass or polymer. Alternatively or additionally, the device 10 may include a carrier in the form of a matrix material embedding the nanorods and providing desired mechanical, chemical and optical properties. The matrix materials can be chosen from materials such as a polymer (formed from liquid or semisolid precursor material such as monomer), epoxy, silicone, glass or a hybrid of silicone and epoxy. Specific examples of polymers include polymers selected from fluorinated polymers, polymers of Polyacrylamide, polymers of Polyacrylic acids, polymers of Polyacrylonitrile, polymers of Polyaniline, polymers of Polybenzophenon, polymers of poly(methyl methacrylate), silicone polymers, Aluminium polymers, polymers of Polybisphenol, polymers of Polybutadiene, polymers of Polydimethylsiloxane, polymers of Polyethylene, polymers of Polyisobutylene, polymers of Polypropylene, polymers of Polystyrene and Polyvinyl polymers. In some embodiments, the polymers may be selected from polyvinyl and fluorinated polymers. In some other embodiments, the polymer may be polyvinyl-butyral, polyvinyl alcohol or polymethyl methacrylate. The thickness of such matrix with embedded nanorods may range from 100 nanometer to 50 micrometer (unit also referred to as microns in the examples), preferably from 0.5 micrometer to 25 micrometers and more preferably between 2 micrometer to 10 micrometer.

As indicated above, the optical emission (typically due to fluorescence) by anisotropic nanoparticles, i.e. nanoparticles having one longer axis relative to two shorter axes, is characterized by a preferred polarization axis. For example, light emitted by fluorescence from a set of aligned nanorods is characterized by substantially linear polarization, where typically at least 51% of the optical intensity or at least 60% of the intensity emitted by a set of aligned nanorods is within a defined preferred polarization. In some configurations, the aligned light emitting nanorods may emit light such that about 70% or more of the emitted light intensity is of the desired polarization state. As indicated above the emitted light may be characterized by the polarization ratio PR defining the ratio between the intensity of light components polarized along the alignment axis of the nanorods and the intensity of light components polarized perpendicular to the alignment axis.

It should be noted, although not specifically shown in FIG. 1, that the light emitting device 10 may include an additional polarization filter located in an optical path of the emitted light. The polarization filter may be a separate optical element attached to the structure of the light emitting device 10 or formed as layer being an integral part of the structure 10 being a layer of the structure itself (e.g. Wire Grid polarizers or In-Cell polarizers). To this end the patterned polarization filter is typically be formed as a layer of patterned polarization elements (filters) typically including a pattern corresponding to the pixel arrangement of the two groups of pixels such that the light emitted from pixels of each group is appropriately filtered to improve polarization characteristics. More specifically, the patterned polarization filter may include a plurality of polarizers arranged to enable transmission of the preferred polarization orientation from each pixel of the two pixel groups. The polarization filter may be an additional layer attached to the light emitting surface of the device 10. Preferably the filter's attachment to the light emitting surface is such as to minimize reflections from the filter (i.e. provides appropriate optical contact between the filter and said surface). It should be noted that such patterned polarization filter layer improves the PR for each pixel. Additionally, energy losses due to the polarization filter are relatively low due to the fact that the light emitted from the aligned nanorods is at least partially polarized and the blocked light components (light components of polarization other than that of the filter) are much less than 50% of the total emitted intensity.

Figure 2:
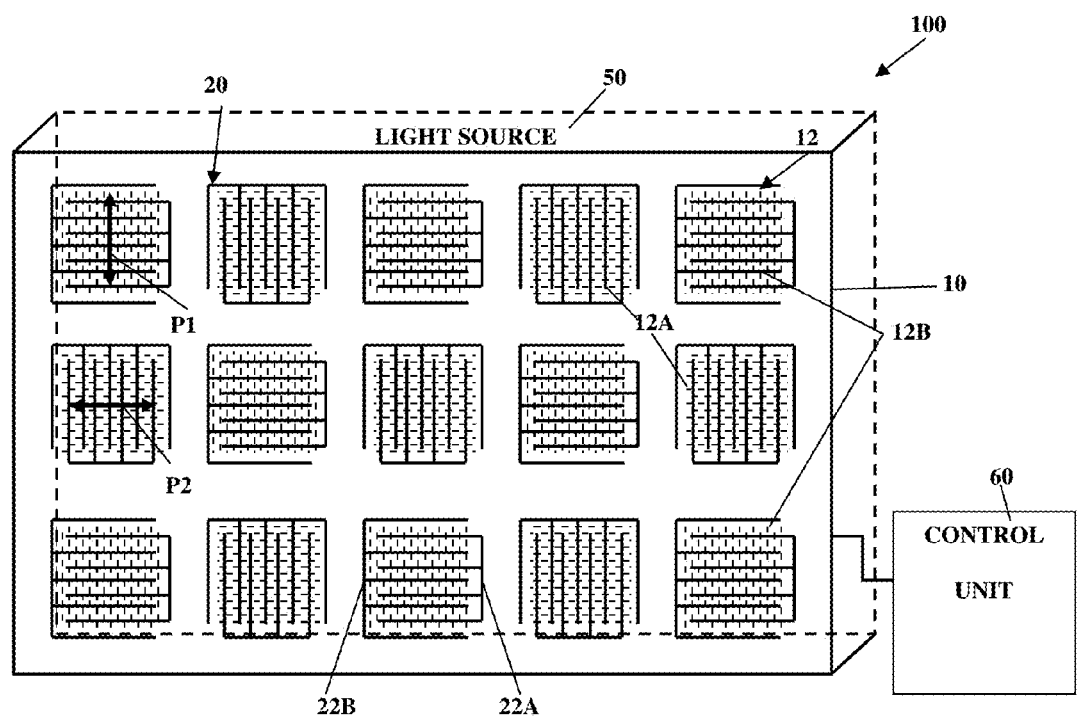
FIG. 2 illustrates a display device according to some embodiments of the present invention configured to enable three-dimensional display effect.

The light emitting device described above may typically be integrated into a display system such as a display unit of portable or domestic electronic devices (e.g. TV screen, display projector). Reference is made to FIG. 2 exemplifying a display device 100 including the light emitting device 10 as described above, a light source unit 50, and a control unit 60 configured to operate the electrode arrangement 20, i.e. provide electric potential (voltage) between electrodes 22A and 22B of appropriate pixels 12 to modulate emission of the corresponding nanorods. By selectively modulating emission of nanorods in different pixels of the device 10, variation of displayed images can be achieved. The light source 50 is configured to illuminate the nanorods by relatively short wavelength (e.g. UV or violet range) thereby providing optical pumping to the nanorods. Typically, light source 50 is configured as a back light source. However, in some embodiments and according to the configuration of the device 10, the light source 50 may be located at one or more sides of the light emitting device 10. As indicated above, a patterned polarization filter is preferably located in the optical path of emitted light and configured to improve the PR of emitted light. Such patterned polarization filter reduces cross-talk between polarization orientations. This enables efficient optical filtering by polarizer glasses used by viewers. It should also be noted that additional films may be used, located between the light emitting structure (pixel array) and the viewer, for converting linear polarization of the emitted light into circular polarization or alter angular orientation of the polarized light. Additionally, various light extracting elements may be attached to the pixel array, or placed in the optical path of emitted light, upstream or downstream with respect to the polarization filter. Such light extracting elements (e.g. prisms, pyramids, microlens etc.) may be used to improve parameters such as directionality or reduce leakage of the emitted light. Preferably, all light extracting elements, as well as all other filters used in the device (e.g. chromatic filter) are configured as optical elements maintaining polarization to thereby preserve the polarization characteristics of the emitted light.

It should be noted that the light source unit 50 may be a single light source or an array of separate light sources configured to provide optical pumping to separate pixels 12, or to a set of pixels located in close proximity. It should also be noted that an array of light sources may illuminate pixels or sets of pixels either by side pumping or back illumination. The different configurations of the light source unit 50 may be used to utilize different filtering techniques of the pumping light. It should also be noted that a plurality of separate pumping light sources may enable higher flexibility for creating different illumination patterns (display of different images), e.g. to provide "local dimming". As indicated above, the light emitting media (nanorods) may be embedded in a carrier/support structure configured to enable exposing the nanorods to the pumping light, and the carrier may have optical windows (e.g. is transparent) for both the pumping and emitted wavelength ranges; or the light emitting media may be deposited on the surface of a carrier which is transparent to pumping and/or emitted wavelength ranges.

Generally, light is emitted from the nanorods toward various directions. However to provide a display system the emitted light should preferably be directed towards a certain direction, leaving the structure in a direction being perpendicular to a certain surface of the structure. To this end the arrangement of the nanorods on a surface (being planar or not) cause most of the emitted light to provide relatively directional illumination in a direction perpendicular to the surface. A reflective layer, at least partially reflective, may be placed along the back-side of the surface reflecting backward emitted light components towards the viewers. The reflective surface is preferably preserving polarization, and configured to transmit the pumping light while reflecting the emitted light. For example the nanorods may be placed/deposited on a dichroic material configured to allow pumping light to pass but reflecting the emitted light. Alternatively, or additionally, a dichroic or other partially reflective layer may be placed between the substrate holding the nanorods and the pumping light source (or a wedge directing the pumping light in case of side-pumping). An additional transparent layer, at least transparent to the emitted light wavelength, may be placed on the nanorods themselves being in the optical path of light emitted towards the viewers, configured to allow transmission of the emitted light while blocking the pumping light from reaching the viewers (e.g. a UV filter layer).

The perpendicular alignment axes of nanorods within the two pixel groups (12A and 12B) enable generation of an illumination pattern having two orthogonal polarizations P1 and P2. Such illumination patterns can be used to provide a three-dimensional effect in display systems and enable a viewer using polarizer glasses (passive glasses) to observe three-dimensional images. The glasses are made of polarization filters transmitting to each user's eye light of one polarization orientation (polarization state), while blocking light of the orthogonal polarization, thereby enabling 3D viewing of an appropriately configured image or image stream (video). More specifically, the display system 100 utilizing the light emitting device 10 according to the present invention can display two different images using pixels of the first and second pixel groups such that a viewer wearing appropriate glasses can see one image with his right eye and another image with his left eye. Such separate imaging to the right and left eyes of the viewer can provide, when the different images are tailored appropriately, for a three-dimensional effect. It should be noted that typically a video needs to be acquired, or at least appropriately processed, to provide a convincing 3D effect.

FIGS. 3A and 3B illustrate a use of the light emitting device 10, which is typically integrated into a display system 100, for viewing three-dimensional image(s). FIG. 3A shows a pixel arrangement of the light emitting device 10 including two groups of pixels emitting light of orthogonal polarizations P1 and P2, and FIG. 3B shows polarization glasses 70 to be worn by a spectator in order to provide the three-dimensional effect. The polarization glasses are configured such that one glass includes a polarizer transmitting light of polarization P1 and the second glass includes a polarizer transmitting light of polarization P2. When a spectator wears such glasses, one of his eyes will receive light emitted by pixels 12A of the device 10 and the other eye will receive light emitted by pixels 12B. The display system may be generally configured to provide two images, from a slightly shifted point of view, being generated by the two groups of pixels respectively. It should be noted that, as mentioned above, the light emitting device may include a polarization rotator configured to rotate polarization of emitted light and/or transform linear polarization to a circular polarization state. Generally polarizations P1 and P2 correspond to the two orthogonal polarization states such as e.g. horizontal and vertical linear polarizations (generally any two linear orthogonal polarization states), or alternatively clockwise and counterclockwise circular polarizations. It should be noted that although these figures show linear polarization of emitted light and linear polarizers as typically used in the glasses, circular polarization may at times be preferred. Moreover, any two orthogonal polarization states which may be separated by an appropriate filter may be used.

Figure 4B:
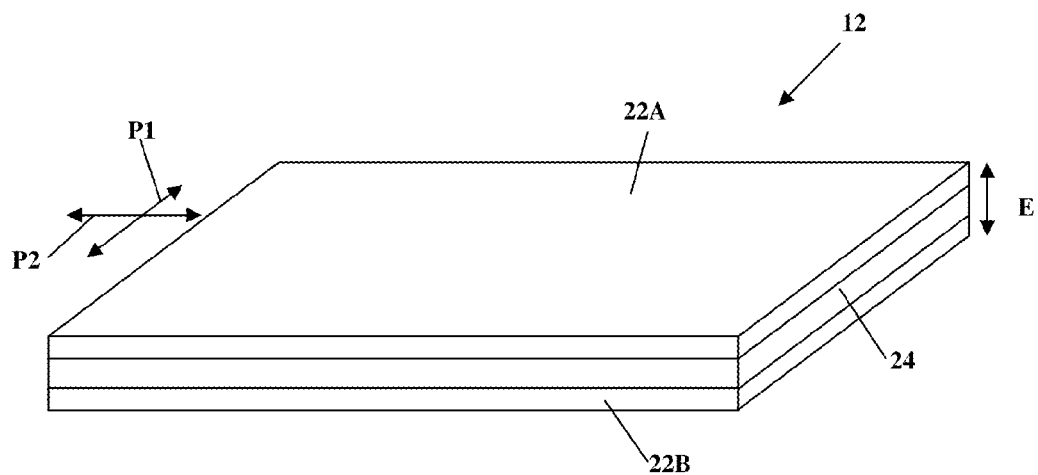

Reference is now made to FIGS. 4A and 4B illustrating two possible configurations of the electrode elements 22A and 22B associated with a single pixel 12 of the light emitting device. FIG. 4A shows an example of in-plane configuration of electrode unit having a fingers-like structure ("comb-like" structure or interdigital electrode units configuration), and FIG. 4B shows a sandwich configuration of the electrodes. In the in-plane configuration, the electrodes 22A and 22B are arranged within the plane of the pixel array 12 and operable such as to provide an electric field with the field lines being substantially parallel to the alignment axis P of the nanorods 24. The electrodes 22A and 22B as shown in this figure are electrode units assembled by plurality of electrode fingers arranged in an interdigital configuration. This interdigital configuration preferably provides substantially parallel electric field lines (although the direction of the electric field may be alternating between different electrode units (fingers)). It should be noted that the electrodes 22a and 22B may also be configured in a capacitor like assembly, such that only two electrodes are located at two opposite sides of the pixel region and the nanorods 24. The distance between adjacent fingers of the two electrode is termed herein below as gap, and is the active region where the applied electric field operates on the aligned nanorods. In the sandwich configuration shown in FIG. 4B, the electrodes 22A and 22B are located within two spaced-apart parallel planes and the pixel array 12 is located in a plane between these two planes of the electrodes. In this configuration, the field lines of the electric field E between the electrodes and the alignment axis of the nanorods (P1 or P2) are substantially perpendicular. This configuration may simplify the electrode arrangement design, but would require a use of optically transparent electrodes in order to enable transmission of pumping light by one electrode and transmission of emitted light by at least the other electrode. It should be noted that the different electrode elements 22A and 22B should typically transmit light of different wavelength ranges and thus different materials may be used. In the sandwiched configuration, the material of one of the electrodes may be used for filtering out of the pumping light. It should also be noted that the sandwiched configuration with appropriate transmission of the electrodes (both of them are transparent for emitted spectrum and filtering out (absorbing) for the pumping spectrum) may be combined with side pumping to thereby enable a double-side display configuration.

Figure 5:
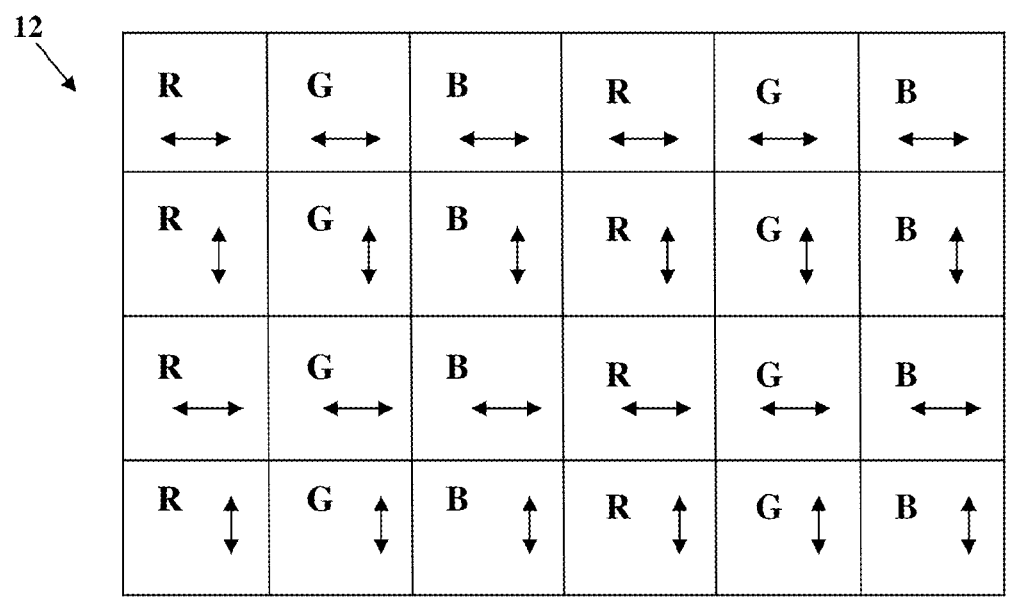
FIG. 5 exemplifies the pixel arrangement for polychromatic display enabling three-dimensional effect.

As also indicated above, pixels of the pixel array may include nanorods configured to emit light of different wavelengths to thereby provide polychromatic display capabilities. FIG. 5 exemplifies a pixel array 12 configuration including pixels of the two groups of pixels configured to emit light of perpendicular polarizations respectively, where each group includes three sets of pixels configured to emit light of three primary colors. In this figure, the pixel array is demonstrated as a matrix wherein different blocks of the matrix represent different pixels configured to emit red (R), green (G) and blue (B) light. The alignment axes of nanorods within different pixels, which correspond to the polarization orientation of the emitted light, are marked by arrows within the different pixels. Thus, as shown, the pixels of the same group emit light of the same polarization and different colors. It should be noted that although typical polychromatic display system utilize three primary colors, the light emitting device of the present invention may include any number or color emitting pixels. It should also be noted that the arrangement of pixels of different colors and/or different polarization exemplified in FIG. 5 is a non-limiting example and any arrangement, including e.g. chess-board arrangement, may be used.

Although anisotropic nanoparticles (nanorods) aligned along a predetermined axis emit light which is substantially of linear polarization along the alignment axis, the three-dimensional display system may benefit from providing images with two orthogonal circular polarization states. As indicated above, the light emitting device of the present invention, being integrated into a display system or not, can be attached to or equipped with a polarization rotator to thereby rotate polarization of the emitted light. For example, a quarter wavelength plate (λ/4 plate) may be placed in the optical path of the emitted light, and arranged to convert one linear polarization state to clockwise circular polarization and the other linear polarization state to counterclockwise circular polarization. To provide such effect, the λ/4 plate may be positioned and arranged such that its optic axis is oriented at an angle of 45° with respect to both linear polarization axes (which are substantially parallel to the alignment axes) of the emitted light. In case of a polychromatic display, and whenever the case may be, separate λ/4 plates may be used for sets of pixels emitting light of different colors. Alternatively an achromatic Broad Band Retarder film may be used. Such achromatic Broad Band Retarder film is typically composed of a "stack" of retarders arranged in different angles and configured to compromise for chromatic dependence of the linear to circular conversion film (as described for example in U.S. Pat. No. 7,969,543, which is incorporated herein by reference with respect to this specific non-limiting example). It should be noted that the configuration and operation of λ/4 plate and various other Retarder films are generally known and thus need not be described herein in details, but to note that such optical elements are typically configured to generate certain delay between polarization components of light passing therethrough. When positioned and arranged appropriately, the λ/4 plate or other Retarder films can be used to convert linearly polarized light to circular polarization and vice versa.

The following is an example of the manufacture and operation of a monochromatic display device utilizing two groups of pixels with perpendicular alignment axes and containing red emitting nanorods. A structure formed by an array of pixels as described above was prepared as follows. A glass wafer of 2 inch in diameter and 0.5 mm in thickness was patterned with aluminum electrodes having width of one micron using conventional lithography and clean room techniques. The pixel pattern is defined by an array of a 4 by 4 pixels placed on a grid with 100 micron spacing, the pixel array is substantially similar to that shown in FIG. 1 but has different number of pixels. The region of each pixel contains an intertwined "comb" structure of the electrode fingers (6 fingers being connected in parallel to one contact and 7 fingers being connected in parallel with the other contact in a similar fashion to the electrode configuration of FIG. 4A showing 4 and 5 electrode fingers). The width of each of the electrode's fingers is 1 micron and the gap between the alternating electrodes is 3 micron. The active area of each pixel is configured to be approximately 50×50 micron. The configuration of the electrodes provides for an active area containing 12 gaps for the fluorescent aligned nanorods.

The electrodes associated with different pixels were connected to pads located a few millimeters outside the square grid. The pixel array was configured to consist of two groups of pixels, such that the electrode arrangement for pixels of the two groups provides perpendicular direction of the electric field between the electrodes. More specifically, the vertical electrode pixels are in columns 1 and 3 and the horizontal electrode pixels are in columns 2 and 4.

Seeded nanorods with a structure of CdSe nanodots within CdS nanorods having length of 45 nm and diameter of 5 nm were synthesized (following similar procedures to those described in L. Carbone et al. "Synthesis and Micrometer-Scale Assembly of Colloidal CdSe/CdS Nanorods Prepared by a Seeded Growth Approach" Nano Letters, 2007, 7 (10), pp 2942-2950 which is incorporated herein by reference with respect to this specific non-limiting example) to serve as the optical active media within the pixels. These nanorods emit red light with a peak wavelength of 635 nm in response to optical pumping by UV radiation. A solution containing the nanorods in toluene is drop-casted on the substrate, under application of an electric field to the electrodes of the entire array. The electric field generated by the electrodes provided for aligning the nanorods in accordance with the electric field vector between the electrode pairs associated with each pixel. The electric field was applied by applying AC voltage with frequency of 10 kHz and voltage of 120 Vpp (peak to peak voltage). Since the electric field is determined by the pixels electrode orientation the nanorods are aligned in each pixel in the required direction.

After evaporation of the solvent, the pixel array is ready for operation. Optical pumping by UV light source (H2A1-H365-S from Roithner Lasertechnik GmbH, Wiedner Hauptstraβe 76, A-1040 Vienna, Austria) with light emission peak at 365 nm is directed at the surface with the nanorods causing the nanorods to fluoresce. Red light emission is viewed from the direction of one surface of the glass substrate opposite to the surface exposed to optical pumping by utilizing linearly polarizing eyeglasses configured such that the right eye mainly sees light emitted by column 1 and 3 while the left eye can see light emitted by column 2 and 4. Additional films such as patterned polarizers, light extracting and quarter wave retarders can be attached to this glass surface as indicated above.

Using a self-made electric driver system, the electric modulation of the optical emission was tested. Each pixel is subjected to different driving voltage of a square alternating polarity waveform at a frequency of 10 kHz and a voltage ranging between 0 to 340 Vpp. The modulation of the pixels ranges from 0% for 0 Vpp driving voltage up to 91-95% (for the various pixels) for 340 Vpp (i.e. 91-95% lower than the emission at 0 Vpp). By measuring the response of each pixel separately to the voltage modulation, the modulating voltage was calibrated to provide equal response from the different pixels (both groups of vertical and horizontal pixels) such that the voltage range provides modulation between 0-91%. The optically active (light emitting) nanorods aligned within the pixels provided PR of emitted light varying between 3.3 to 3.8, and thus a certain crossover between the images was seen. As indicated above, such crossover between the different polarizations of emitted light is reduced, and may be eliminated, by a patterned polarization filter located in the optical path of emitted light.

A $\lambda/4$ film was placed in optical path of the emitted light, being positioned such that the optic axis thereof is oriented at an angle of 45° with respect to the polarization axes of both polarized light components. This configuration of the $\lambda/4$ film provides for converting the linearly polarized light into circular polarized light such that light components of one polarization orientation are converted to clockwise circular polarization while light components of the perpendicular polarization orientation are converted into counter-clockwise circular polarization. An additional UV blocking film was placed on the glass surface facing the viewer configured to block the pumping UV radiation. Observing the emitted light with appropriate polarization filter glasses provided that, regardless of the viewer's head orientation, one eye sees mainly the light emitted from one group of pixels while the other eye sees mainly light emitted from the other group of pixels.

In order to make a polychromatic display device the inventors used additional Green emitting nanorods having length of 47 nm and diameter of 3.5 in addition to the red emitting nanorods described above. The nanorod were prepared in a similar fashion and the peak emission was at a wavelength of 458 nm.

A 4 by 4 array of pixels was prepared with pixel size of 2×2 mm on a 2 inch 0.5 mm glass wafer. Each pixel was configured with combed electrode structure similar to that of FIG. 4A with a gap of 10 micron between the electrode fingers and width of 5 micron for each finger. The pixel array elements are placed on a square grid with spacing of 3 mm. The nanorods were prepared in two different Toluene solutions and deposited in corresponding pixels to generate the appropriately selected polychromatic pattern. The deposition of the solution was done using a pipette depositing a drop volume of 0.2 µL for each pixel. Electric potential of 250 Vpp at 10 kHz between the electrodes of each pixel was applied during the deposition to align the nanorods along the appropriate axis, and to enable even spreading on the large size pixel. Additionally the applied potential assists in preventing the solution (and the nanorods) from spreading outside the pixel region.

In this example the pixel matrix was constructed such that columns 1 and 3 have vertical alignment direction and columns 2 and 4 are aligned horizontally. The red nanorods were deposited in columns 1 and 2 and the green nanorods were deposited in columns 3 and 4 to provide the selected color scheme.

The optically active (light emitting) nanorods aligned within the pixels provided PR of emitted light varying between 3.9 to 4.7, and thus a certain crossover between the images was seen.

Additional polarizer film layers were constructed on the glass side (display side) of the pixel array, located opposite to the electrode elements, configured to appropriately filter the emitted light to provide higher PR. The filter layers are forms of 3 mm stripes polarizer films (e.g. obtained from MeCan Imaging Inc.). As described in the previous example, an additional UV blocking film was placed on the glass surface facing the viewer configured to block the pumping UV radiation.

The structure was optically pumped by UV light source as described above from the electrode's surface of the structure. When optically pumped, the nanorods of each pixel emitted light of red or green colors. Modulation of the emitted light was provided by selectively supplying voltages having square wave driving at 10 kHz with Vpp of up to 750 Volts. This electric modulation produced modulation of up to 89% on the various pixels. When the structure was observed through oriented polarizer (e.g. polarizer glasses) columns 1 and 3 were seen brighter through vertical polarizer and columns 2 and 4 were seen brighter through horizontal polarizer.

An additional polarization rotator was placed on the structure, in optical path of emitted light, to provide two orthogonal circular polarization states. The polarization rotator used was (MCR140A, a commercial purpose, high quality $\lambda/4$ film obtained from MeCan Imaging Inc.). In this configuration the pixels of different polarization were separately seen using circular polarization filters.

It should be noted that the increased pixel size described in the above example can be used for large size display systems such as billboards. However it should also be noted that the pixel size is limited by the construction technique used in selected examples and not by the principles of the present invention.

Thus, the present invention provides a light emitting device capable of generating desirably patterned illumination composed of two orthogonal polarization states of light, to thereby provide a monochromatic or polychromatic display. The device may be integrated into a display system, as well as enable three-dimensional effects for images and video display. Typical display systems may be screens for use in a variety of electronic devices, televisions, billboard etc. Those skilled in the art will readily appreciate that various modifications and changes can be applied to the embodiments of the invention as hereinbefore described without departing from its scope defined in and by the appended claims or by combinations of the claims.

The invention claimed is:

1. A light emitting device comprising an array of pixels and an electrode arrangement, wherein said array of pixels comprises pixels of first and second groups comprising first and second pluralities of light emitting nanorods aligned along first and second predetermined axes respectively, the axes being substantially perpendicular to each other, and the pixels of said array are associated with a plurality of electrode elements of said electrode arrangement thereby enabling modulation of optical emission of one or more pixels separately from one or more other pixels of said pixel array by controllable application of an electric field, the device being therefore configured and operable as an active pixel emitter.

2. The device of claim 1, wherein said light emitting nanorods emit light of a first predetermined wavelength range in response to pumping radiation of a second predetermined wavelength range.

3. The device of claim 2, wherein said first wavelength range comprises visible spectrum.

4. The device of claim 1, wherein the aligned light emitting nanorods of said first and second groups of pixels emit light of two substantially orthogonal polarizations respectively.

5. The device of claim 4, comprising a polarization rotator located in an optical path of light emitted from said light emitting nanorods, said polarization rotator being configured to modify said orthogonal polarizations of emitted light to produce light of two opposite circular polarizations respectively.

6. The device of claim 1, wherein said light emitting nanorods emit light having a polarization ratio being higher than 1.5, wherein the polarization ratio is defined as the intensity ratio between the emitted light components with polarization parallel and perpendicular to the direction of nanorod alignment.

7. The device claim 1, wherein said electrode elements are configured and operable to apply electric field to said one or more pixels thereby quenching optical emission therefrom.

8. The device of claim 1, wherein said electrode elements are configured to define a plurality of dedicated pairs of the electrode elements for a plurality of pixels respectively, thereby enabling separate electric field modulation for individual pixels.

9. The device of claim 1, wherein said light emitting nanorods comprise nanorods configured to emit light of at least three different wavelengths, nanorods emitting light of the different wavelengths being associated with different pixels of said pixel array.

10. The device of claim 1, comprising a support structure carrying said light emitting nanorods, said structure being configured to enable exposure of said array of pixels to pumping radiation.

11. The device of claim 1, comprising a light source configured and operable to provide optical pumping radiation to said light emitting nanorods.

12. The device of claim 1, comprising a patterned polarization filter located in an optical path of emitted light, said patterned polarization filter being configured to improve the polarization ratio of emitted light from pixels of said two groups.

13. The device of claim 1, comprising a polarization rotator located in an optical path of light emitted from said light emitting nanorods, said polarization rotator being configured to modify polarization of emitted light to thereby produce circular polarized light.

14. The device of claim 1, wherein said electrode arrangement and said array of pixels are arranged in a common plane.

15. The device of claim 1, wherein the electrode elements associated with the pixels of the first and second groups of pixels are configured to apply the electric field along two axes substantially parallel to the first and second alignment axes of the nanorods of said pixels respectively.

16. The device of claim 1, wherein said electrode arrangement comprises first and second sets of the electrode elements located within first and second planes respectively, and said array of pixels is located in a plane between said first and second planes.

17. The device of claim 1, wherein the nanorods are embedded in a carrier, being optically transparent for the pumping light and emitted light.

18. The device of claim 1, wherein the nanorods are deposited on a substrate carrier, which is optically transparent for at least one of the pumping light and emitted light.

19. The device of claim 1, wherein the nanorods are made of one or more semiconductor materials.

20. The device of claim 1, wherein the nanorods have an elongated geometry with an aspect ratio of at least 2.

21. The device of claim 1, wherein the nanorods have a core-shell configuration.

22. The device of claim 1, wherein the nanorods are configured as seeded rods.

23. The device of claim 22, wherein a seed in the seeded nanorod has a spherical or rod-like geometry.

24. The device of claim 1, configured and operable to emit patterned light of different first and second optical properties formed by the light emitted by the first and second pluralities of the light emitting nanorods respectively, thereby enabling for simultaneous imaging of first and second different images.

25. An active pixel display device comprising a pumping light source, the light emitting device of claim 1 arranged such that the nanorods are exposed to pumping light, and a control unit configured to operate the electrode arrangement to control application of the electric field to selected one or more pixels of said pixel array.

26. The display device of claim 25, wherein the control unit is operable to cause selective application of the electric field to one or more pixels of the first and second groups, thereby enabling simultaneous display of two separate images.

27. The display device of claim 25, configured to enable a three-dimensional effect for the display of an image stream.

* * * * *